UNITED STATES PATENT OFFICE.

JAKOB SCHMID, OF BASLE, SWITZERLAND, ASSIGNOR TO SOCIETY OF CHEMICAL INDUSTRY IN BASLE, OF SAME PLACE.

BLUE TETRAZO DYE AND PROCESS OF MAKING SAME.

SPECIFICATION forming part of Letters Patent No. 620,369, dated February 28, 1899.

Application filed July 2, 1898. Serial No. 685,005. (Specimens.)

*To all whom it may concern:*

Be it known that I, JAKOB SCHMID, chemist and doctor of philosophy, a citizen of the Swiss Republic, and a resident of Basle, Switzerland, have invented certain Improvements in the Manufacture of Blue Tetrazo Dyes, of which the following is a clear and complete specification.

My invention relates to the production of blue substantive dyestuffs, distinguished by the brightness of their tints, by first combining molecular proportions of naphthacetoldisulfo-acid and of the tetrazo derivative of a paradiamin of the series of diphenyl and then combining one molecule of a not further diazotizable intermediate product thus obtained with one molecule of an amidonaphtholsulfo-acid.

Example: 2.12 parts of tolidin are diazotized in the normal manner by means of 5.5 parts of hydrochloric acid and 4.6 parts of a thirty-per-cent. solution of sodium nitrite. The solution of the tetrazo body thus obtained is introduced into a cold aqueous solution of 3.6 parts of 1:8:3:6 naphthacetoldisulfo-acid (prepared as described in another application for Letters Patent, Serial No. 685,004, filed July 2, 1898,) containing an excess of sodium carbonate or sodium acetate. The intermediate product separates in the form of a dark mass. As soon as the free tetrazo body has disappeared there is introduced into the mass 3.3 parts of amidonaphtholdisulfo-acid 1:8:3:6, and the formation of the coloring-matter is effected by agitating the mixture for some hours and then heating to the boiling-point. The coloring-matter is precipitated by common salt, filtered, pressed, and dried. In this example the 1:8:3:6 naphthacetoldisulfo-acid may be replaced by the 1:8:4:6, 1:8:2:4, or 1:5:3:7 naphthacetoldisulfo-acid, and for tolidin benzidin or dianisidin may be substituted, while the 1:8:3:6 amidonaphtholdisulfo-acid may be replaced by 1:8:2:4, 1:5:3:7, or 1:8:4:6 amidonaphtholdisulfo-acid or 2:8:6 or 1:8:6 amidonaphtholmono-acid.

The new coloring-matter forms in dry state a bronze-like powder, insoluble in alcohol, ether, and benzene, soluble in water with a blue coloration, and in concentrated sulfuric acid with a green-blue to blue-green coloration. It dyes unmordanted cotton in blue to greenish-blue tints of great purity and contains only one diazotizable amido group, and consequently absorbs on diazotization only one molecular proportion of nitrous acid. By diazotizing the coloring-matter in substance or on the fiber and combining the diazo body thus obtained with beta-naphthol or metaphenylendiamin it yields trisazo coloring-matters with a variation in tint to dark blue.

What I claim is—

1. The process for the manufacture of blue coloring-matters by first combining molecular proportions of a naphthacetoldisulfo-acid and the tetrazo derivative of a paradiamin of the series of diphenyl, then combining one molecule of the intermediate product thus obtained with one molecule of an amidonaphtholsulfo-acid.

2. As a new article of manufacture, the herein-described blue coloring-matter, which contains the radical of a naphthacetoldisulfo-acid, forms in dry state a dark bronze-like powder, soluble in water with a blue coloration, and in concentrated sulfuric acid with a green-blue to blue-green coloration, is insoluble in alcohol, ether and benzene, contains only one diazotizable amido group, is therefore enabled to react only with one molecular proportion of nitrous acid, and gives dark-blue tints by combination of its diazo derivative with beta-naphthol or metaphenylendiamin, either in substance or on the fiber.

In witness whereof I have hereunto signed my name, this 18th day of June, 1898, in the presence of two subscribing witnesses.

JAKOB SCHMID.

Witnesses:
GEORGE GIFFORD,
AMAND RITTER.